May 12, 1942.   W. R. MAGUIRE   2,282,525
QUICK FREEZING APPARATUS
Filed June 30, 1939   3 Sheets-Sheet 1

INVENTOR
Walter R. Maguire
BY
Morgan Finnegan & Durham
ATTORNEYS

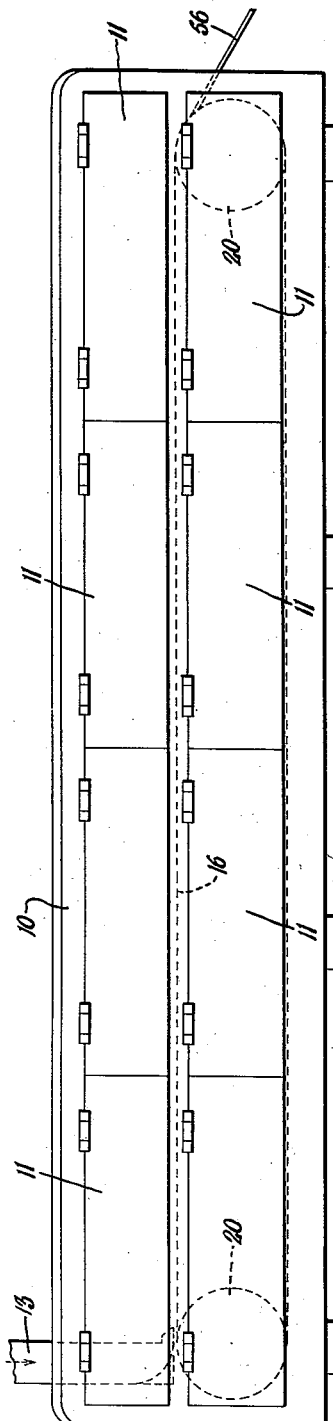
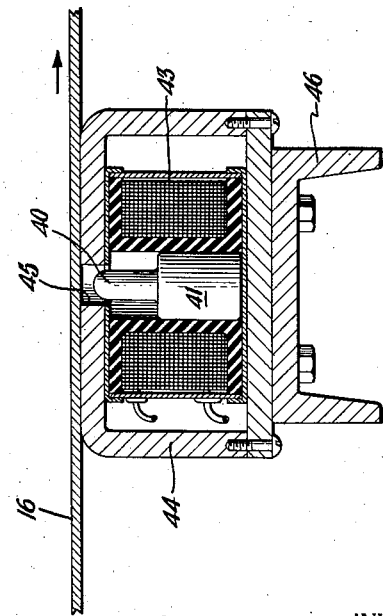
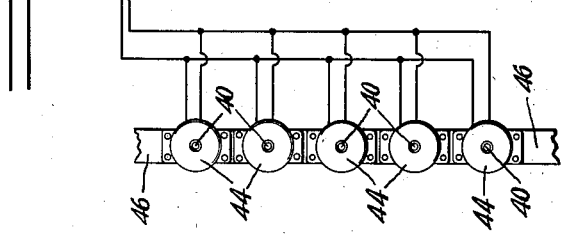

May 12, 1942.  W. R. MAGUIRE  2,282,525
QUICK FREEZING APPARATUS
Filed June 30, 1939  3 Sheets-Sheet 3

INVENTOR
Walter R. Maguire
BY
Morgan, Finnegan & Durham
ATTORNEYS

Patented May 12, 1942

2,282,525

UNITED STATES PATENT OFFICE 2,282,525

QUICK FREEZING APPARATUS

Walter R. Maguire, Manhasset, N. Y.

Application June 30, 1939, Serial No. 282,222

13 Claims. (Cl. 62—114)

The present invention relates to new and useful improvements in the method of and apparatus for the quick freezing of fluids, such as cream.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate embodiments of the invention, and together with the description, serve to explain the principles of the invention.

Of the drawings:

Figure 3 is a side elevation of the apparatus shown in Figures 1 and 2;

Figure 4 is a central sectional view of a vibrator used in connection with the present invention;

Figure 5 is a plan view of a group of vibrators with the circuit connections.

Figures 1, 2:
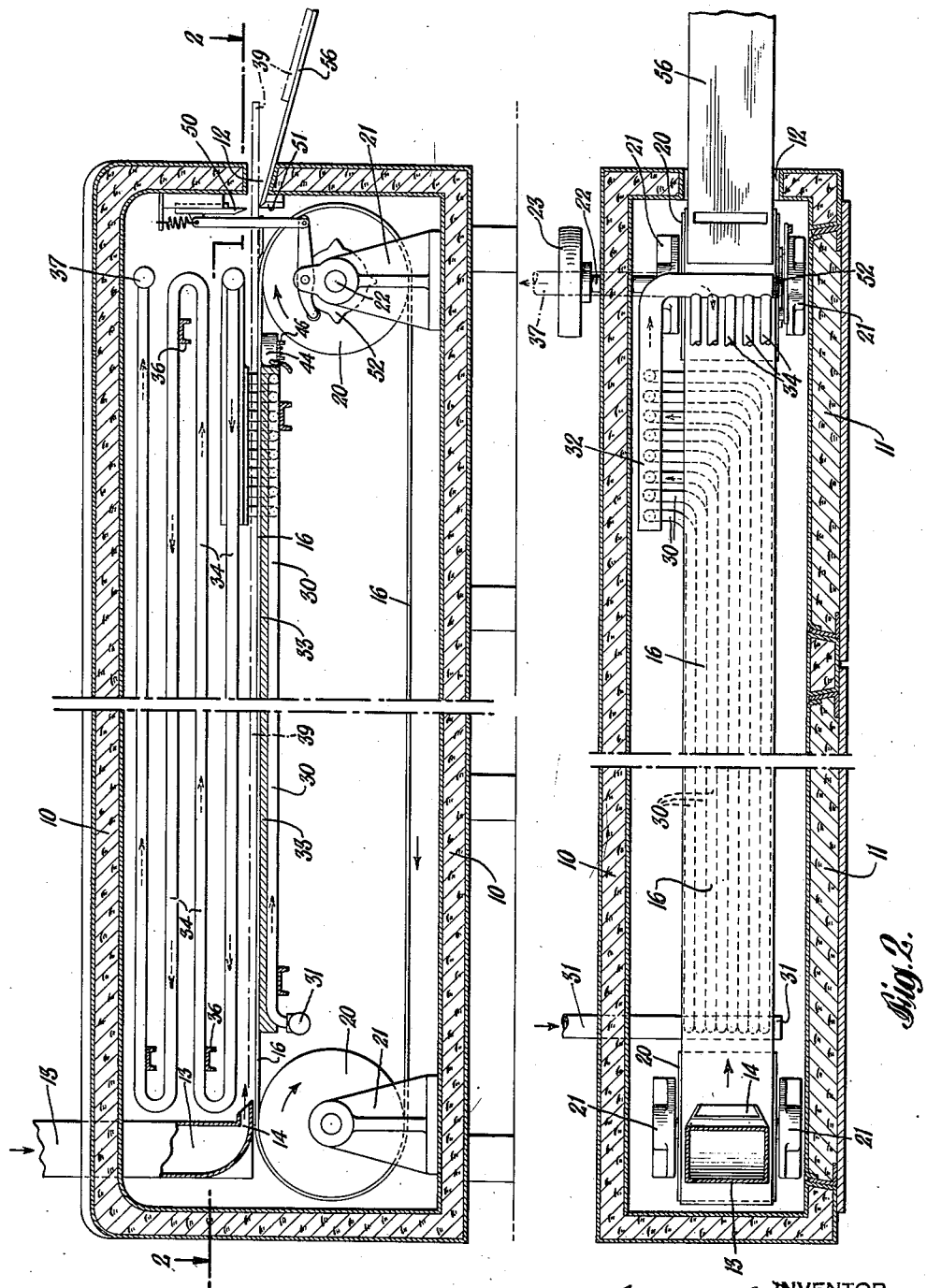
Figure 1 is a longitudinal and diagrammatic section showing a typical and illustrative embodiment of the invention.
Figure 2 is a horizontal diagrammatic section taken on the line 2—2 of Figure 1.

The present invention has for its object the provision of a novel and improved method of and apparatus for the quick, economical and sanitary freezing of fluids, such as cream. A further object is the provision of an improved method of and apparatus for the continuous freezing of cream so that the cream may be stored for long periods of time without substantial change and may be merchandized as a frozen product which can be reconstituted as fluid cream in the home or other place of use. Still another object of the invention is the provision of an improved means for freezing fluids which produces the frozen fluid in sheet form thereby greatly facilitating its packaging and storage. The invention also provides an apparatus for the freezing of fluids in which the freezing is accomplished by good thermal contact between the fluids and the refrigerating means, and in which such thermal contact may be established between the freezing fluids and both of its surfaces, thereby increasing the rapidity with which the complete freezing may be accomplished.

In accordance with the present and illustrative embodiment of the apparatus for carrying out the method of the present invention, a moving belt of non-absorptive, highly heat-conductive material is moved continuously over rollers or drums at its ends and within a heat-insulated cabinet. Means are provided for flowing a layer or sheet of fluid cream or other liquid to be frozen upon the belt near one end of its upper reach and the upper reach of the belt is supported upon and in intimate thermal relationship with a substantially continuous surface having high heat conductivity in which are embedded or otherwise held the refrigerating means, such as direct expansion pipes or coils. The refrigerating means are of such capacity and are preferably operated at such an intensity that the surface of the belt is maintained at an extremely cold temperature well below the freezing point of the fluid being treated, and the belt is of considerable length so that the product is entirely frozen by the time the freshly applied fluid has reached the other end of the upper reach of the belt.

Means are provided for loosening the frozen fluid from the belt and comprise a vibrator means acting directly on the frozen fluid-supporting belt so as to loosen the frozen fluid therefrom, and other means are provided for severing the sheetlike frozen fluid from the belt, preferably into sheets of uniform area and thickness. An opening is provided at one end of the cabinet through which the sheet-like pieces of frozen cream are discharged from the belt.

In accordance with a modified embodiment of the invention, a second belt of substantially similar construction is provided and is mounted by rollers or drums immediately above the first belt so that its lower reach is spaced slightly from the upper reach of the lower belt a distance corresponding closely to the thickness of the frozen fluid on the lower belt. This upper belt preferably runs in contact with a similar heat-conductive surface in direct and good thermal contact with the direct expansion coils or pipes of the upper unit, and the upper belt may be of slightly shorter length than the lower belt, beginning its contact with the upper surface of the fluid to be frozen almost immediately after the fluid has been delivered onto the lower belt.

Thus the lower belt cools the cream and starts the freezing so that the lower portion of the layer first freezes and as the freezing action progresses upwardly, the unfrozen upper portion of the layer comes in contact with the cold upper belt and heat is removed from the layer of fluid in both directions, thereby increasing the thickness of the layer which can be frozen in a given time, or reducing the time for freezing a given layer.

It will be understood that the foregoing general description and the following detailed description as well are exemplary and explanatory of the invention but are not restrictive thereof.

Referring now in detail to the illustrative embodiment of the invention as shown in the accompanying drawings, the invention is shown in Figures 1 to 5 as applied to an apparatus for freezing cream on a single belt which is housed within a cabinet formed by the heat-insulated walls 10 which are provided on at least one side with a series of doors 11 which give access to every part of the mechanism. At one end of the cabinet there is provided a slot 12 through which the frozen product may be delivered, while at the other end of the cabinet there is provided a delivery pipe 13 into which cream is poured or otherwise delivered so as to flow through the restricted nozzle and onto the belt.

Means are provided for supporting the fluid to be frozen and these means also form the refrigerated surface on which the actual freezing takes place. As embodied, there is provided an endless belt 16, of relatively great length compared with its width, and this belt is preferably formed of a substantially non-corrosive, highly heat-conductive material which can be repeatedly bent without damage, such as stainless steel. Means provided for supporting and driving the belt comprise a pair of relatively large diameter drums 20 rotatably mounted on parallel axes which are held in fixed positions relative to each other by means of the supports 21.

Means provided for driving one or the other of the drums 20 comprise the shaft 22 by which the drum is rotatably mounted, and a pulley 23 which may be driven from any suitable source of power.

For cooling the upper reach of the belt 16 to an extremely low temperature, such as is necessary for the freezing of the fluids supported thereon there is provided a series of closely adjacent and parallel, direct expansion coils or pipes 30 supported in horizontal alinement and extending from a point near one drum 20 to another point near the other drum 20. These pipes 30 receive the refrigerating medium such as ammonia under compression, from a header 31 and at their other end are connected to an outlet header 32. In order to secure better thermal contact between the pipes 30 and the under surface of the upper reach of belt 16, the pipes 30 are preferably positioned in a solid block of tin 33 or other good heat conducting material to provide a smooth upper surface in intimate and substantially continuous contact with the belt 16.

The upper portion of the cabinet preferably contains a relatively large area of cooling surface so as to keep the general temperature within the cabinet at a relatively low point and for this purpose the header 32 is connected to a series of refrigerating coils 34 which are supported by beams 36 in the upper portion of the cabinet, these pipes being connected to another header 37 which serves to return the expanded ammonia or other refrigerating fluid to the compressor in the conventional manner.

Means are provided for loosening the layer 39 of frozen fluid from the surface of the belt 16 before the belt passes over the drum 20, and these means are preferably positioned between the right hand drum 20 and the adjacent end of the refrigerating surface 33. As embodied, these means comprise a vibrator which rapidly shakes the belt throughout a small area and in a vigorous manner, thereby freeing the layer of frozen fluid from the surface of the belt without destroying the sheet-like form of the frozen fluid (see Fig. 4).

For this purpose, one or more solenoid actuated members are provided transversely of the belt so that they may be brought into rapid, sharp contact with the under surface of the belt. This means may comprise a plunger 40 secured to or integral with a vertically reciprocally actuated armature 41 mounted within and moved by the alternating current solenoid 43. A housing 44 apertured at 45 surrounds the solenoid 43 and permits the plunger 40 to be projected upwardly therethrough, while the solenoid is supported on a transverse bar 46 extending across and beneath the belt 16. As the alternating current is applied to the solenoid, the armature 41 is rapidly moved up and down, bringing the plunger 40 into contact with the belt 16.

As the sheet of frozen fluid is moved forward by the belt 16, it passes between the knives 50 and 51, and these knives are periodically and quickly actuated, as by means of cam 52 driven from shaft 22, so as to sever the frozen fluid into definite smaller sized sheets which are more readily packed and these sheets fall on to the discharge chute 56 from which they may be removed in any suitable manner for packaging.

In accordance with the method of the present invention, the cream or other fluid to be frozen, is supplied to the supply pipe 13, and flows out of the restricted nozzle 14 as a relatively thick stream on to the belt 16 which is relatively cold, due both to its heat capacity and to the general temperature within the cabinet. As the belt moves forward it comes into intimate thermal contact with the refrigerated surface 33 which is maintained at a temperature well below zero and even as low as 30 or 40 degrees below zero F.

The cream immediately begins to congeal and is completely frozen in a very short period of time and well before the cream reaches the line of vibrators 40. As the cream comes in contact with these vibrators, the belt is rapidly and vigorously shaken and the cream in a frozen sheet is loosened from the upper surface of the belt to which it has only a slight adhesion.

Thereafter, the cream is cut into sheets of definite length, producing sheets of substantially uniform area and thickness, and as these are delivered onto the chute 56, they may be collected and stacked one on top of each other to provide a compact package comprising laminated sheets of cream, in which condition the cream will keep almost indefinitely and when desired the cream may be reconstituted without homogenization.

Figure 6:
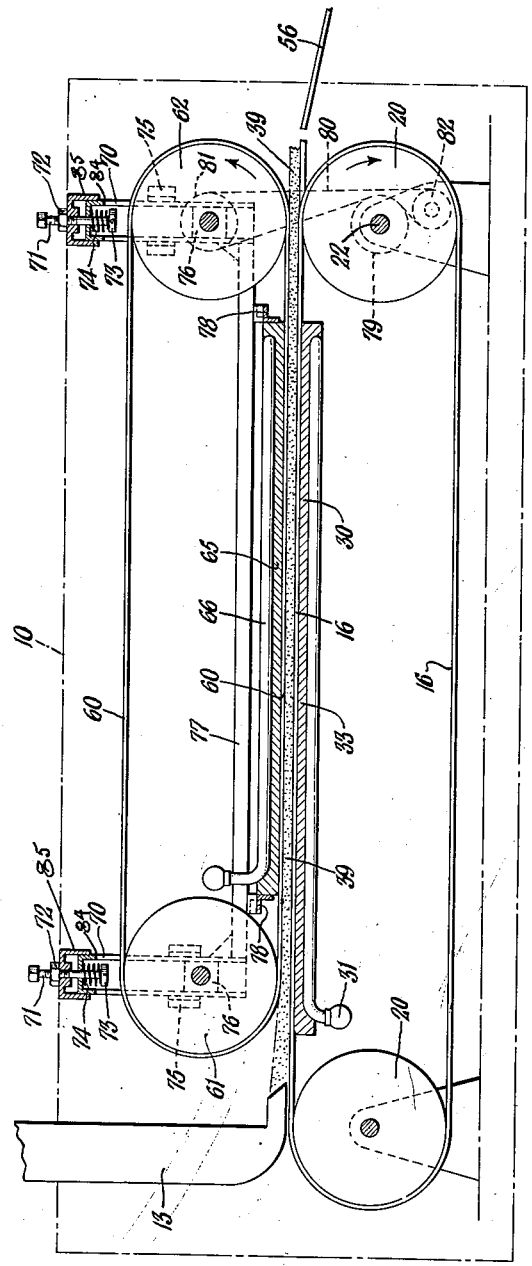
Figure 6 is a longitudinal vertical section, diagrammatically showing a modified embodiment of the present invention.

In the modified embodiment of the invention shown in Figure 6, a second belt 60 is supported above and spaced slightly from the lower belt 16. The second belt 60 is supported by drums 61 and 62 so as to be driven at the same rate as the lower belt 16. Belt 60 is spaced from the belt 16 a distance equal to the thickness of the layer of fluid to be frozen so that the freezing and frozen fluid support the belt 60 and press it upwardly and into contact with the upper refrigerating surface 65 which may be a duplicate, except as to length, of the surface 33, the pipes 66 being above the surface 65 and forming a support therefor.

Belt 60 is driven from shaft 22 by means of a sprocket 79 and chain 80 running over idler 82 and driven sprocket 81, so that the adjacent reaches of belts 16 and 60 travel at the same speed and in the same direction.

Belt 60 is resiliently supported to insure its uniform and firm contact with the supper surface of the frozen and freezing fluid. The drums 61 and 62 are rotatably journaled in the journal blocks 76 supported in the end uprights 70 of the frame, while the uprights are interconnected by cross beams or channels 84 at the upper ends and by longitudinal channels 77 to which the upper refrigerating surface is connected at its ends by angle supports 78. The frame is supported by means of compression springs 74, held in compression between head 73 and the cross channel and supported from another cross beam 84 by means of the main supports 85 by means of the bolts 71 threaded into the support 85 and locked by nut 72.

Thus the major portion of the load is supported by springs 74 and the position of the belt 60 relative to the belt 16 may be minutely varied so as to accommodate different thicknesses of frozen fluid. The severing means of Figure 1 may be used if desired, as may the loosening means.

The invention in its broader aspects is not limited to the specific mechanisms shown and described but departures may be made therefrom within the scope of the accompanying claims without departing from the principles of the invention and without sacrificing its chief advantages.

What I claim is:

1. Apparatus for the quick freezing of fluids, such as cream, including a moving endless metal belt, means for delivering a layer of fluid onto the belt, a continuous heat conductive surface in which refrigerating pipes are embedded said surface being in contact with the major portion of the under side of the upper reach of the belt, a vibrator acting on an unsupported portion of the belt for freeing the frozen fluid from the surface of the belt, means for severing the frozen fluid into sheets of substantially uniform length and an insulated cabinet enclosing the belt and refrigerating pipes.

2. Apparatus for the quick freezing of fluids, such as cream, including a moving endless metal belt, means for delivering a layer of fluid onto the belt, a surface in which refrigerating pipes are embedded said surface being in contact with the major portion of the under side of the upper reach of the belt, a vibrator acting on an unsupported portion of the belt for freeing the frozen fluid from the surface of the belt, means for severing the frozen fluid into sheets of substantially uniform length and an insulated cabinet enclosing the belt and refrigerating pipes.

3. Apparatus for the quick freezing of fluids, such as cream, including a moving endless metal belt, means for delivering a layer of fluid onto the belt, a continuous heat conductive surface in which refrigerating pipes are embedded said surface being in contact with the under side of the upper reach of the belt, a vibrator acting on an unsupported portion of the belt for freeing the frozen fluid from the surface of the belt, means for severing the frozen fluid into sheets of substantially uniform length and an insulated cabinet enclosing the belt and refrigerating pipes.

4. Apparatus for the quick freezing of fluids, such as cream, including a moving endless metal belt, means for delivering a layer of fluid onto the belt, a continuous heat conductive surface in which refrigerating pipes are embedded said surface being in contact with the major portion of the under side of the upper reach of the belt, a vibrator acting on the belt for freeing the frozen fluid from the surface of the belt, means for severing the frozen fluid into sheets of substantially uniform length and an insulated cabinet enclosing the belt and refrigerating pipes.

5. Apparatus for the quick freezing of fluids, such as cream, including a moving endless metal belt, means for delivering a layer of fluid onto the belt, a continuous heat conductive surface in which refrigerating pipes are embedded said surface being in contact with the major portion of the under side of the upper reach of the belt, a vibrator acting on an unsupported portion of the belt for freeing the frozen fluid from the surface of the belt, means for severing the frozen fluid into sheets and an insulated cabinet enclosing the belt and refrigerating pipes.

6. Apparatus for the quick freezing of fluids, such as cream, including a moving endless metal belt, means for delivering a layer of fluid onto the belt, a surface in which refrigerating pipes are embedded said surface being in contact with the under side of the upper reach of the belt, a vibrator acting on an unsupported portion of the belt for freeing the frozen fluid from the surface of the belt, means for severing the frozen fluid into sheets and an insulated cabinet enclosing the belt and refrigerating pipes.

7. Apparatus for the quick freezing of fluids, such as cream, including a moving endless metal belt, means for delivering a layer of fluid onto the belt, a surface in which refregerating pipes are embedded said surface being in contact with the under side of the upper reach of the belt, a vibrator acting on the belt for freeing the frozen fluid from the surface of the belt, means for severing the frozen fluid into sheets and an insulated cabinet enclosing the belt and refrigerating pipes.

8. Apparatus for the quick freezing of fluids, such as cream, including a moving endless metal belt, means for delivering a layer of fluid onto the belt, a substantially continuous heat-conductive surface in which refrigerating pipes are embedded, said surface forming a support for the upper reach of the belt, a vibrator acting on an unsupported portion of the belt for freeing the frozen fluid from the surface of the belt, means for severing the frozen fluid into sheets of substantially uniform length and an insulated cabinet enclosing the belt and refrigerating pipes.

9. Apparatus for the quick freezing of fluids, such as cream, including a moving endless metal belt, means for delivering a layer of fluid onto the belt, a substantially continuous heat-conductive surface in which refrigerating pipes are embedded, said surface forming a support for the upper reach of the belt, means for freeing the frozen fluid from the surface of the belt, periodically operating means actuated in timed relation to the movement of the moving surface for severing the frozen fluid into sheets of substantially uniform length and an insulated cabinet enclosing the belt and refrigerating pipes.

10. Apparatus for the quick freezing of fluids, such as cream, including a moving endless metal belt, means for delivering a layer of fluid onto the belt, a substantially continuous heat-conductive surface in which refrigerating pipes are embedded, said surface forming a support for the upper reach of the belt, a vibrator acting on an unsupported portion of the belt for freeing the frozen fluid from the surface of the belt, and means for severing the frozen fluid into sheets.

11. A method of producing frozen cream including flowing a layer of fluid cream onto a cold, moving, heat-conductive surface, moving the surface over an extremely cold member and in contact therewith until the fluid cream is entirely frozen, loosening the frozen cream from the moving surface without destroying the sheet-like form of the frozen cream and severing the frozen sheet of cream into smaller sheets.

12. A method of producing frozen fluids including flowing a uniform layer of fluid onto a cold, moving, heat-conductive surface, moving the surface over and in good thermal contact with an extremely cold member and in contact therewith until the fluid is entirely frozen, loosening the frozen fluid from the moving surface without destroying the sheet-like form of the frozen fluid and severing the frozen sheet of fluid into smaller sheets.

13. A method of producing frozen fluids including uniformly flowing a layer of fluid onto an extremely cold, moving, heat-conductive surface, bringing the upper surface of the freezing fluid into contact with another extremely cold, moving heat-conductive surface until the fluid is entirely frozen, loosening the frozen fluid from the surfaces and severing the frozen sheet of fluid into smaller sheets of substantially uniform size and thickness.

WALTER R. MAGUIRE.